US00RE48514E

(19) United States
(12) Reissued Patent
Fujimoto

(10) Patent Number: US RE48,514 E
(45) Date of Reissued Patent: *Apr. 13, 2021

(54) SEMICONDUCTOR DEVICE

(71) Applicant: TOSHIBA MEMORY CORPORATION, Minato-ku (JP)

(72) Inventor: Akihisa Fujimoto, Yamato (JP)

(73) Assignee: TOSHIBA MEMORY CORPORATION, Minato-ku (JP)

( * ) Notice: This patent is subject to a terminal disclaimer.

(21) Appl. No.: 16/234,925

(22) Filed: Dec. 28, 2018

Related U.S. Patent Documents

Reissue of:
(64) Patent No.: 9,146,866
Issued: Sep. 29, 2015
Appl. No.: 13/424,482
Filed: Mar. 20, 2012

U.S. Applications:
(63) Continuation of application No. 15/466,117, filed on Mar. 22, 2017, now Pat. No. Re. 47,290, which is an
(Continued)

(30) Foreign Application Priority Data

Sep. 24, 2009 (JP) ..... 2009-219691
Sep. 25, 2009 (JP) ..... 2009-221468

(51) Int. Cl.
*G06F 3/00* (2006.01)
*G06F 12/06* (2006.01)
*G06F 13/42* (2006.01)

(52) U.S. Cl.
CPC ..... *G06F 12/0661* (2013.01); *G06F 13/4291* (2013.01); *G06F 2213/0052* (2013.01)

(58) Field of Classification Search
CPC ..... G06F 12/0661; G06F 2213/0052; G06F 13/4291
See application file for complete search history.

(56) References Cited

U.S. PATENT DOCUMENTS 5,404,460 A 4/1995 Thomsen
5,802,345 A * 9/1998 Matsunami et al. ..... 703/27
(Continued)

FOREIGN PATENT DOCUMENTS

CN 1190838 A 8/1998
CN 1459958 A 12/2003
(Continued)

OTHER PUBLICATIONS

Japanese Office Action dated Mar. 13, 2012, in Japan Patent Application No. 2009-221468 (with English translation).
(Continued)

*Primary Examiner* — William H. Wood
(74) *Attorney, Agent, or Firm* — Oblon, McClelland, Maier & Neustadt, L.L.P.

(57) ABSTRACT

According to one embodiment, a semiconductor device includes a device. The device includes a decoder, a generation circuit, a register, and a modifier. The decoder analyzes a command of a received packet. The generation circuit generates a unique device number in accordance with information in the packet. The register holds the generated unique device number. The modifier updates and outputs the packet. When a packet issued by a host is a command packet, among broadcast packets which return to the host through one or more devices, for determining the unique device number, the command packet includes parameters of an initial value and final value of device number.

5 Claims, 10 Drawing Sheets

Related U.S. Application Data application for the reissue of Pat. No. 9,146,866, which is a continuation of application No. PCT/JP2010/066513, filed on Sep. 24, 2010.

(56) References Cited

U.S. PATENT DOCUMENTS

| | | | | |
|---|---|---|---|---|
| 6,230,274 | B1 | 5/2001 | Stevens | |
| 6,820,148 | B1 | 11/2004 | Cedar et al. | |
| 8,031,709 | B2 * | 10/2011 | Alexander, Jr. | 370/389 |
| 8,364,861 | B2 | 1/2013 | Pyeon | |
| 8,700,818 | B2 | 4/2014 | Pyeon | |
| 8,984,249 | B2 | 3/2015 | Pyeon | |
| 9,240,227 | B2 | 1/2016 | Pyeon | |
| 2003/0128702 | A1 * | 7/2003 | Satoh et al. | 370/390 |
| 2004/0047298 | A1 * | 3/2004 | Yook et al. | 370/254 |
| 2005/0138226 | A1 * | 6/2005 | Tateyama et al. | 710/11 |
| 2006/0282549 | A1 | 12/2006 | Vinnemann | |
| 2008/0080492 | A1 | 4/2008 | Pyeon | |
| 2008/0140916 | A1 | 6/2008 | Oh | |
| 2008/0177922 | A1 | 7/2008 | Chow | |
| 2008/0195613 | A1 | 8/2008 | Sumi | |
| 2009/0077344 | A1 | 3/2009 | Mylly et al. | |
| 2010/0169535 | A1 * | 7/2010 | Saxby et al. | 710/316 |
| 2010/0174866 | A1 | 7/2010 | Fujimoto et al. | |
| 2011/0022665 | A1 * | 1/2011 | Pinto et al. | 709/206 |

FOREIGN PATENT DOCUMENTS

| | | | |
|---|---|---|---|
| CN | 1308855 | C | 4/2007 |
| CN | 101449251 | A | 6/2009 |
| JP | 51-73801 | | 6/1976 |
| JP | 58-30254 | | 2/1983 |
| JP | 2-58944 | | 2/1990 |
| JP | H03-251945 | | 11/1991 |
| JP | 10-4373 | | 1/1998 |
| JP | 11-177495 | | 7/1999 |
| JP | 2003-196230 | A | 7/2003 |
| JP | 2003-198497 | | 7/2003 |
| JP | 2005-277978 | | 10/2005 |
| JP | 2009-20905 | A | 1/2009 |
| TW | I261788 | | 9/2006 |
| TW | 200801957 | A | 1/2008 |
| WO | 2007/134444 | A1 | 11/2007 |
| WO | 2009/027802 | A1 | 3/2009 |

OTHER PUBLICATIONS

International Preliminary Report on Patentability dated Apr. 19, 2012 in PCT/JP2010/066513 filed Sep. 24, 2010.

Written Opinion dated Dec. 28, 2010 in PCT/JP2010/066513 filed Sep. 14, 2010 submitting English translation only.

Combined Chinese Office Actiono and Search Report dated Jan. 26, 2014 in Patent Application No. 201080039726.6 with English language translation and English Translation of Category of Cited Documents.

Extended European Search Report dated Mar. 25, 2014 in Patent Application No. 10818840.0.

Taiwanese Office Action dated Jun. 13, 2014, in Taiwan Patent Application No. 099132498 (with English translation).

Office Action dated on Dec. 29, 2014 in Chinese Patent Application No. 201080039726.6, along with its English translation.

International Search Report dated Dec. 28, 2010 issued for International Application No. PCT/JP2010/066513, filed on Sep. 24, 2010 (English).

International Written Opinion dated Dec. 28, 2010 issued for International Application No. PCT/JP2010/066513, filed on Sep. 24, 2010.

Office Action dated Jun. 2, 2015 in Chinese Patent Application No. 201080039726.6, along with its English translation.

* cited by examiner

SEMICONDUCTOR DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a Continuation application of PCT Application No. PCT/JP2010/066513, filed Sep. 24, 2010 and based upon and claiming the benefit of priority from prior Japanese Patent Applications No. 2009-219691, filed Sep. 24, 2009; and No. 2009-221468, filed Sep. 25, 2009, the entire contents of all of which are incorporated herein by reference.

*This application is a continuation reissue application of application Ser. No. 15/466,117, filed Mar. 22, 2017 and issued as U.S. Pat. No. RE47,290 on Mar. 12, 2019. U.S. Pat. No. RE47,290 is a reissue application of U.S. Pat. No. 9,146,866 issued on Sep. 29, 2015.*

FIELD

Embodiments described herein relate generally to a semiconductor device and a host apparatus.

BACKGROUND

An SD (trademark) card is known as a memory system using a NAND flash memory. An SD interface is known as an interface between an SD card and a host apparatus.

DETAILED DESCRIPTION

Figure 1:
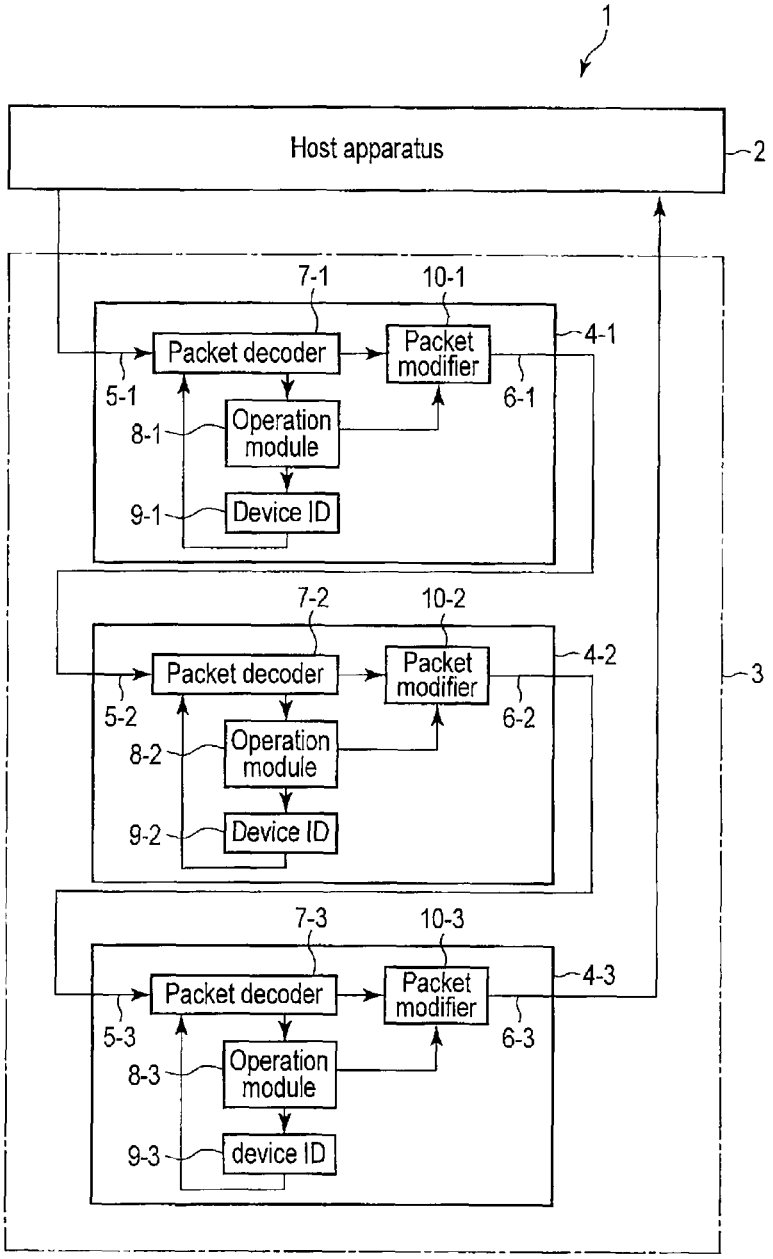
FIG. 1 is a block diagram of a semiconductor system according to a first embodiment.

In general, according to one embodiment, a semiconductor device includes a device. The device includes: a decoder; a generation circuit; a register; and a modifier. The decoder analyzes a command of a received packet to determine processing specified by the packet. The generation circuit generates a unique device number in accordance with information in the packet. The register holds the generated unique device number. The modifier updates and outputs the packet. A packet issued by a host is a command packet, among broadcast packets which return to the host through one or more devices, for determining the unique device number, the command packet includes parameters of an initial value and final value of device number. The device, when the device detects that the device first receives the command packet for determining the unique device number, determines device number in accordance with the initial value of the received command packet, sets the determined device number to the register, updates the initial value and the final value in the command packet to the determined device number, and transmits the command packet to a next device or the host, and when the device detects that the device does not first receive the command packet for determining the unique device number, calculates device number different from determined device number of another device based on the initial value and/or the final value in the received command packet, set the calculated device number to the register, updates the final value to the calculated device number without updating the initial value in the command packet, and transmits the command packet to a next device or the host.

An SD interface can connect a plurality of devices to a bus by an address (relative card address: RCA) that selects a device. However, if an attempt is made to control more and more devices by one host apparatus according to this method, problems of increasing complexity of the configuration and design of the host apparatus and possible overlapping of device addresses are posed.

Some embodiments will be described below with reference to the drawings. In the following description, common reference numerals are attached to common elements throughout drawings. However, the drawings are schematic and dimensional relations or ratios of mutual dimensions may be different between the drawings.

Each embodiment shown below exemplifies devices and methods to embody the present technical idea and the technical idea does not limit the material, shape, structure, arrangement and the like of components to those described below. The technical idea can be changed in a variety of ways in the claims.

Each functional block of each embodiment can be realized by hardware, computer software, or a combination of both. Thus, each block is described below generally in terms of the function thereof so that it becomes clear that each block is realized by any of the above. Whether such a function is executed as hardware or software depends on the specific form or design restrictions imposed on the whole system. Persons skilled in the art can realize these functions by various methods for each concrete form and deciding such realization is also included in the scope of the present invention.

First Embodiment

A semiconductor device and a host apparatus according to the first embodiment will be described. FIG. 1 is a block diagram showing an example of a semiconductor system including a semiconductor device and a host apparatus according to the present embodiment.

<Configuration of the Semiconductor System>

An illustrated semiconductor system 1 includes a host apparatus 2 and a semiconductor device 3.

The host apparatus 1 includes at least one input port and at least one output port and controls the operation of the semiconductor device 3 through these ports to manage an operation of the semiconductor system 1. For example, each port is configured as a differential pair based on a low voltage differential signaling (LVDS) system or the like.

The host apparatus 2 assembles a packet containing commands and data and transmits the packet to the semiconductor device 3 to control the operation of the semiconductor device 3. The host apparatus 2 also receives a packet transmitted from the semiconductor device 3 and operates in accordance with the received packet.

The semiconductor device 3 includes a plurality of electronic devices 4. FIG. 1 exemplifies a case when the three electronic devices 4 are included as an example. When the three electronic devices 4 are distinguished below, the electronic devices 4 are referred to as the electronic devices 4-1 to 4-3.

In the present example, each of the electronic devices 4 includes an input signal pin 5, an output signal pin 6, a packet decoder 7, an operation module 8, a register 9, and a packet modifier 10. When the above elements should be distinguished for each of the electronic devices 4-1 to 4-3, these elements are denoted as input signal pins 5-1 to 5-3, output signal pins 6-1 to 6-3, packet decoders 7-1 to 7-3 operation modules 8-1 to 8-3, registers 9-1 to 9-3, and packet modifiers 10-1 to 10-3.

The input signal pin 5 configured by a plurality of signals functions as at least an input port and receives packets provided from outside. Then, the input signal pin 5 transfers the received packet to the packet decoder 7.

The packet decoder 7 is configured to be able to analyze a packet transferred from the input signal pin 5. The packet decoder 7 identifies the type of packet based on a command number inside a packet header. Then, the packet decoder 7 instructs the operation module 8 to perform an operation according to a type of the packet. The packet decoder 7 also instructs the packet modifier 10 to modify the received packet if necessary.

The operation module 8 is configured to be able to perform necessary operations in accordance with instructions from the packet decoder 7. An example of operation content is the calculation of a device ID. When the device ID is calculated, the operation module 8 causes the register 9 to hold the device ID. The device ID is a number specific to each of the electronic devices 4 and the host apparatus 2 can identify each of the electronic devices 4 based on the device ID. If the received packet is not a broadcast (for example, unicast or multicast), the packet decoder 7 can determine whether the packet is addressed to the packet decoder 7 by comparing the device ID contained in the packet as destination information and the device ID in the register 9.

The packet modifier 10 updates content of the payload of the received packet and outputs the packet from the output signal pin 6 configured by a plurality of signals and functioning as at least an output port. If, for example, the device ID is calculated by the operation module 8, the packet modifier 10 updates content of the payload in accordance with a result of the calculation.

The three electronic devices 4-1 to 4-3 having the above configuration are ring-connected (also chain-connected) to the host apparatus 2, as shown in FIG. 1. That is, a packet transmitted from the host apparatus 2 is first received by the electronic device 4-1 and then, the packet is transmitted from the electronic device 4-1 to the electronic device 4-2, further transmitted from the electronic device 4-2 to the electronic device 4-3, and the packet output from the output signal pin 6-3 of the electronic device 4-3 is returned to the host apparatus 2. Incidentally, the semiconductor device 3 in FIG. 1 includes a case when the semiconductor device 3 is configured by the electronic devices 4-1 to 4-3 and a hub 12 like those in FIG. 6 described later.

<Packet Configuration>

Figure 2:
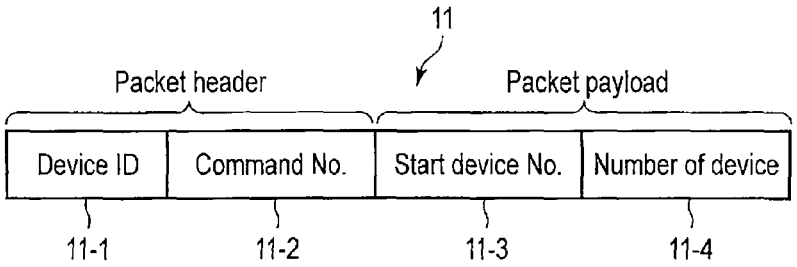
FIG. 2 is a conceptual diagram of a frame format according to the first embodiment.

Next, the configuration of the above packet will be described. FIG. 2 is a conceptual diagram of a packet and shows a packet that is issued when the device ID of each of the electronic devices 4 is identified.

As shown in FIG. 2, a packet 11 roughly contains the packet header and the payload. The payload of the packet is a net data portion to become content to be transmitted and the packet header is additional information thereof.

The packet header includes at least fields 11-1, 11-2. The device ID to be the destination of the packet is stored in the field 11-1. The command number is stored in the field 11-2 and the operation to be performed on the packet is specified by the command number. Though omitted in FIG. 2, the packet header may contain, in addition to the above fields, fields to store information such as the device ID (or the ID of the host apparatus 2) of the transmission source of the packet and the packet size.

The payload stores various kinds of data depending on content to be transmitted. A packet issued when the device ID is identified contains at least fields 11-3, 11-4. The field 11-3 is a field indicating the start device ID (start device No.) and the number is decided by the electronic device 4 that first receives the packet from the host apparatus 2. The field 11-4 stores the number of the electronic devices 4. The host apparatus 2 can recognize the total number of the electronic devices 4 based on the value of the field 11-4 incremented in the process of the packet being transferred from the electronic device 4 to the electronic device 4. The host apparatus 2 can also identify the device ID of each of the electronic devices 4 from the values of the fields 11-3, 11-4. The operation will be described in detail later.

In addition to the number of the electronic devices 4, the field 11-4 may indicate the last device No. If the last device No. and the first device No. are known, the number of devices can be calculated from a subtraction, which allows the same handling as the present embodiment. A case when the last device No. information is contained in a packet will be described later separately from the present embodiment.

<Operation of the Host Apparatus 2>

Figure 3:
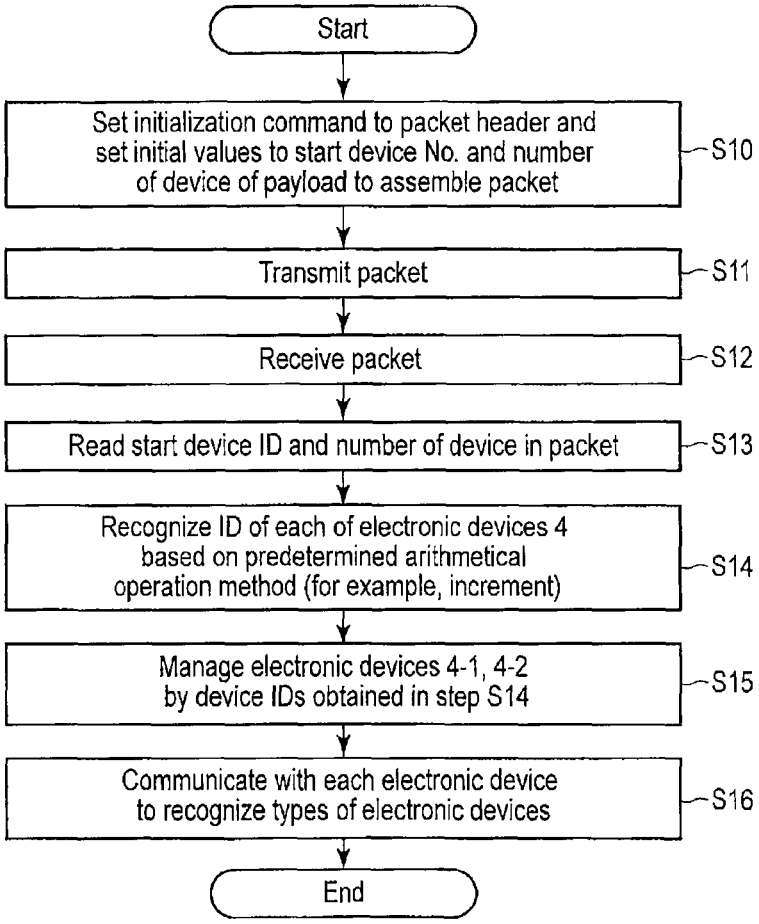
FIG. 3 is a flow chart showing an operation of a host apparatus according to the first embodiment.

Next, the operation of the host apparatus 2 configured as described above when the device ID of the electronic device 4 is identified will be described by using FIG. 3. FIG. 3 is a flow chart showing the operation of the host apparatus 2 when the device ID is identified.

As shown in FIG. 3, the host apparatus 2 first assembles a packet to identify the device ID (step S10). That is, the host apparatus 2 sets a command (hereinafter, called an initialization command) to identify the device ID to the command number (field 11-2) of the packet header and sets the start device ID (field 11-3) of the payload and the initial value (0 in the present embodiment) as the value of the number of devices (field 11-4).

Then, the host apparatus 2 transmits the packet assembled in step S10 to the electronic device 4 (step S11). Whether the packet is transmitted by a broadcast or unicast (or multicast) is preset for each command. The initialization command is a broadcast command. Thus, the destination of the field 11-1 of the packet header is ignored and the packet is transmitted to the first electronic device 4-1 in the ring connection for the connection relation of FIG. 1. The field 11-1 indicating the destination of the packet is ignored when the broadcast is used.

Subsequently, the host apparatus 2 receives a packet from the last electronic device 4-3 in the ring connection (step S12). Then, the host apparatus 2 reads the first device ID (field 11-3) and the number of devices (field 11-4) (step S13). The value of the field 11-3 is the device ID of the first electronic device 4-1 in the ring connection and the value of the field 11-4 the total number (three in the present example) of the ring-connected electronic devices 4-1 to 4-3.

Next, the host apparatus 2 performs a preset arithmetical operation using the values of the fields 11-3, 11-4 to recognize the device IDs of the electronic devices 4-2, 4-3 and the total number of devices (step S14). The number of identifiable devices depends on the number of bits of the device ID field. The preset arithmetical operation is a rule for calculating device IDs for the electronic devices 4-2, 4-3 with respect to the start device ID and, for example, incrementing by the number of devices. Therefore, if, for example, the value of the start device ID in the packet received from the electronic device 4-3 is "n (n is a natural number)", it is known that the device ID of the electronic device 4-1 is "n", the device ID of the electronic device 4-2 is "n+1", and the device ID of the electronic device 4-3 is "n+2".

Then, the host apparatus 2 will manage each of the electronic devices 4-1 to 4-3 by using the device IDs obtained in step S14. Subsequently, the host apparatus 2 uses these device IDs to communicate with each of the electronic devices 4-1 to 4-3 to recognize the type (for example, whether a memory, I/O device, or card device) of the electronic devices 4-1 to 4-3 before initialization is completed.

<Operation of the Electronic Device 4>

Figure 4:
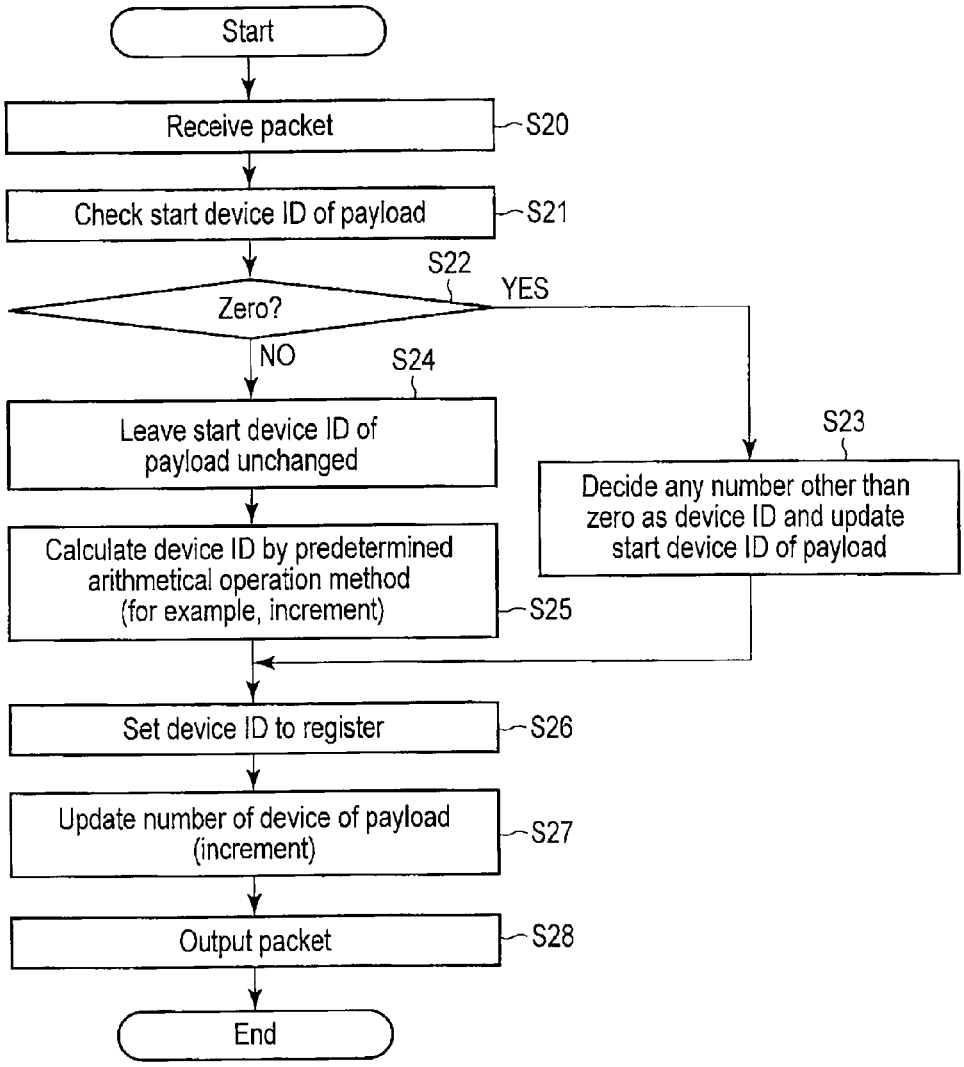
FIG. 4 is a flow chart showing the operation of a device according to the first embodiment.

Next, the operation of the electronic device 4 will be described by using FIG. 4. FIG. 4 is a flow chart showing the operation of the electronic device 4 when a packet containing the initialization command is received and is a flow chart common to the electronic devices 4-1 to 4-3.

As shown in FIG. 4, the electronic device 4 receives a packet through the input signal pin 5 (step S20). Then, if the packet decoder 7 recognizes that the packet contains the initialization command from the command number in the field 11-2 of the received packet, the packet decoder 7 instructs the operation module 8 to calculate the device ID of the electronic device 4.

The operation module 8 that has received the instruction checks whether the value (start device ID) of the field 11-3 of the received packet is a predetermined value (0 in the present embodiment) set by the host apparatus 2 (step S21). If the value is 0 (step S22, YES), the operation module 8 decides any number other than 0 as the device ID of the electronic device 4 and instructs the packet modifier 10 to update (modify) the value (start device ID) of the field 11-3 to the decided device ID. Accordingly, the packet modifier 10 updates the field 11-3. The reason for using a number other than 0 is that 0 is allocated as the device ID of the host apparatus 2.

On the other hand, if the value of the field 11-3 is not a predetermined value set by the host apparatus 2 (step S22, NO), the value of the field 11-3 is left unchanged (step S24). That is, the operation module 8 does not instruct the packet modifier 10 to update the value of the field 11-3. Then, the operation module 8 performs a preset operation by using the field 11-3 to calculate the device ID of the electronic device 4 (step S25). The operation in step S25 is the same as the operation performed in step S14 and, for example, the field 11-3 (start device ID) is incremented as many times as the field 11-4 (number of devices).

Subsequently, the operation module 8 stores the device ID of the electronic device 4 decided in step S23 or S25 in the register 9 (step S26).

Further, the packet modifier 10 updates (increments) the value of the field 11-4 of the received packet according to the instruction of the packet decoder 7 or the operation module 8. Then, the packet modifier 10 outputs the packet in which the field 11-4 or both the fields 11-3, 11-4 are updated.

<Operation of the Semiconductor System 1>

Figure 5:
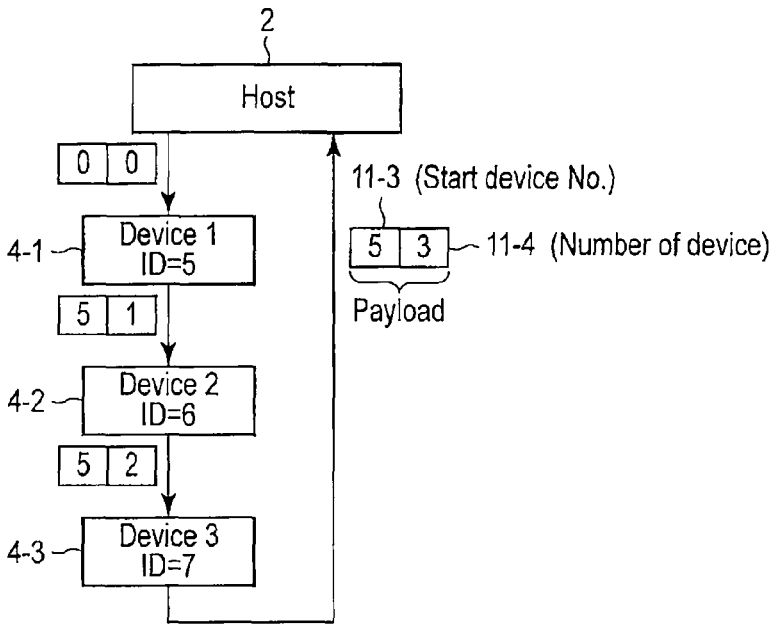
FIG. 5 is a block diagram of the semiconductor system according to the first embodiment.

Next, the operation of the whole semiconductor system 1 when the device ID of the electronic device 4 is identified will be described by using FIG. 5. FIG. 5 is a block diagram of the semiconductor system 1. In FIG. 5, square marks attached to the side of an arrow between devices show content of the payload and the left side indicates content of the field 11-3 (start device ID) and the right side indicates content of the field 11-4 (number of devices).

As shown in FIG. 5, a packet containing the initialization command is first broadcast from the host apparatus 2. At this point, the values of the fields 11-3, 11-4 are predetermined values (0) set by the host apparatus 2 (steps S10, S11 in FIG. 3). The packet is first received by the electronic device 4-1.

In the electronic device 4-1, the value of the field 11-3 is "0" (step S22 in FIG. 4, YES) and any number is decided as the device ID of the electronic device 4-1. The device ID is "5" in the example of FIG. 5. Then, the electronic device 4-1 updates the field 11-3 from "0" to "5" (step S23 in FIG. 4), increments the value of the field 11-4 from "0" to "1" (step S27 in FIG. 4) and outputs the updated packet.

The packet output from the electronic device 4-1 is next received by the electronic device 4-2. The value of the field 11-3 is not "0" in the electronic device 4-2 (step S22 in FIG. 4, NO) and the device ID of the electronic device 4-2 is calculated according to a preset operation method (step S25 in FIG. 4). That is, the value of the field 11-3 is incremented by the value of the field 11-4 to determine the device ID of the electronic device 4-2 as "5"+"1"="6". Then, while the value of the field 11-3 is left unchanged (step S24 in FIG. 4), the value of the field 11-4 is updated from "1" to "2" by an increment (step S27 in FIG. 4) and the updated packet is output.

The packet output from the electronic device 4-2 is next received by the electronic device 4-3. The value of the field 11-3 is not "0" also in the electronic device 4-3 (step S22 in FIG. 4, NO) and the device ID of the electronic device 4-3 is calculated according to a preset operation method (step S25 in FIG. 4). That is, the value of the field 11-3 is incremented by the value of the field 11-4 to determine the device ID of the electronic device 4-2 as "5"+"1"+"1"="7". Then, while the value of the field 11-3 is left unchanged (step S24 in FIG. 4), the value of the field 11-4 is updated from "2" to "3" by an increment (step S27 in FIG. 4) and the updated packet is output.

The packet output from the electronic device 4-3 is received by the host apparatus 2. The value of the field 11-3 is "5" and the value of the field 11-4 is "3" in the packet. Thus, the host apparatus can grasp that the device ID of the electronic device 4-1 is "5" and the total number of the electronic devices 4 is "3" (step S13 in FIG. 3). Then, the host apparatus 2 recognizes that the device ID of the electronic device 4-2 second in the ring connection is "6" obtained by incrementing the device ID "5" of the electronic device 4-1 by "1" and the device ID of the electronic device 4-3 third in the ring connection is "7" obtained by incrementing the device ID "5" of the electronic device 4-1 by "2" (step S14).

Thereafter, the host apparatus 2 manages the electronic devices 4-1 to 4-3 by using the devices IDs "5" to "7" respectively. That is, if, for example, data should be transmitted to the electronic device 4-2, the device ID="6" is set to the field 11-1 as the destination of the packet. Then, the value of the field 11-1 of the received packet and the value of the register 9 match in the electronic device 4-2 and the electronic device 4-2 can determine that the packet is addressed to the electronic device 4-2. In the electronic devices 4-1, 4-2, on the other hand, the value of the field 11-1 of the received packet and the value of the register 9 do not match and these electronic devices can determine that the packet is not addressed to these electronic devices. When a packet is transmitted to the host apparatus 2 from the electronic device 4 as a source, the device ID="0" is set to the field 11-1 as the destination thereof.

Packets can also be transmitted and received between the electronic devices 4. If, for example, the host apparatus 2 instructs the electronic device 4-1 to transfer data to the electronic device 4-3, the device ID="5" is set to the field 11-1 of the packet. Also, data to be transmitted as the payload and the device ID="7" as the destination thereof are set. The electronic device 4-3 that has received the packet sets the device ID="7" to the field 11-1 and transmits the packet in which the data to be transmitted is set as the payload. Then, the packet can be received by the electronic device 4-3.

<Effect According to the Present Embodiment>

As described above, a semiconductor device and a host apparatus according to the present embodiment can attach an ID specific to each device while limiting complexity of the configuration. This effect will be described below.

Various methods to connect a plurality of electronic devices to the same bus have been known. However, according to a conventional method by which the host controls and sets a specific number, it is necessary to prepare a different signal line for each electronic device and connect the electronic device and the host apparatus by using each signal line or an additional signal to generate an ID for identification to identify each electronic device, causing a problem of increasing complexity of the configuration. In recent years, on the other hand, a desire to connect more embedded devices to one host apparatus is increasing. Therefore, according to, for example, the method of preparing a signal line for each embedded device, a problem of increasing complexity of the configuration and ineffectiveness is posed.

As described in Background Art, the SD interface can connect a plurality of devices to one bus by using the RCA. The command CMD3 is prepared as a command requesting the RCA for the SD interface. If the CMD3 is issued, an electronic device generates an RCA and transmits the RCA to the host apparatus. However, each electronic device randomly generates without consideration of RCAs of other electronic devices. The RCA is a value of, for example, 16 bits and if the number of connected electronic devices is not large, the possibility of an overlapping RCA between electronic devices is small. However, the possibility thereof is not 0 and it is necessary for the host apparatus to check for any overlap between electronic devices of the RCA issued by each electronic device. If any overlap is detected, it is necessary to instruct electronic devices to re-generate RCAs.

In this respect, the above conventional problem can be solved by a configuration according to the present embodiment. First, the host apparatus 2 broadcasts a packet requesting the device ID of each of the electronic devices 4. The packet is sequentially transferred between the electronic devices 4 in the order of connection while the respective device ID being issued by each of the electronic devices 4. Thus, there is no need to prepare a signal line for each electronic device and the host apparatus needs to have at least one output port and one input port. Therefore, the configuration can be simplified.

Moreover, a different device ID for each of the electronic devices 4 can be set. This is because information about the device ID in the packet is updated each time the electronic device 4 is passed through. More specifically, the electronic device 4-1 that has first received a packet from the host apparatus 2 decides any number as the device ID of the electronic device 4-1. Then, the electronic device 4-1 stores information about the device ID thereof (device ID and the number of devices) in the packet and transfers the packet to the next electronic device 4-2. The electronic device 4-2 that next receives the packet can know the device ID of the electronic device 4-1 from the received packet. Therefore, the electronic device 4-2 can set a device ID that is different from the device ID of the electronic device 4-1 as the device ID of the electronic device 4-2 by performing a predetermined operation for the device ID of the electronic device 4-1.

This applies also to the subsequent electronic device 4-3. That is, the packet received by the electronic device 4-3 stores the device ID of the electronic device 4-1 and the number of electronic devices passed before the electronic device 4-3 is reached. Thus, the electronic device 4-3 can grasp the device IDs of the electronic devices 4-1, 4-2. Therefore, the electronic device 4-3 can set a device ID that is different from the device IDs of the electronic devices 4-1, 4-2 as the device ID of the electronic device 4-3.

As a result, the electronic devices 4 can have mutually different device IDs set thereto. Thus, there is no need for the host apparatus 2 to check for any overlap of the device ID and the initialization operation can be simplified.

Moreover, the host apparatus 2 receives a response to the packet containing the initialization command only from the last electronic device 4-3 and there is no need to receive a response from the other electronic devices 4-1, 4-2. This is because the overlap of device IDs can be prevented and there is no need to communicate with each of the electronic devices 4-1 to 4-3 for the initialization operation. That is, processing of the host apparatus 2 can be simplified. As a result, the processing of the host apparatus 2 in FIG. 3 can easily be realized by hardware. Therefore, initialization processing can be accelerated.

The reason therefor is described below. If software is used for processing, for example, when the semiconductor system 1 is turned on, it is necessary to wait for activation of the OS (operating system) and the like. After the activation of the OS is completed, a program for initialization processing is read to perform the processing in FIG. 3. However, when processing in FIG. 3 is performed by hardware, there is no need to wait for the activation of the OS and the like.

Therefore, the host apparatus 2 can obtain the device ID of each of the electronic devices 4 at high speed.

Second Embodiment

Next, a semiconductor device and a host apparatus according to the second embodiment will be described. The present 50 embodiment relates to various connection methods of electronic devices 4 in the first embodiment. The description of the same points as in the first embodiment is omitted below.

First Connection Example

Figure 6:
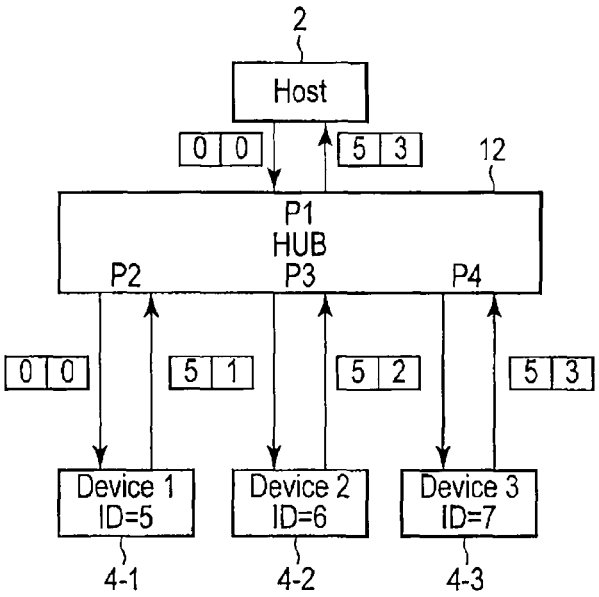
FIG. 6 is a block diagram of a memory system according to a second embodiment.

The first embodiment is described by taking a case when, as shown in FIG. 1, the electronic devices 4 are ring-connected as an example. However, a hub may also be used as shown as a first connection example of the present embodiment. FIG. 6 is a block diagram showing an example of a semiconductor system 1 according to the first connection example of the present embodiment.

As shown in FIG. 6, the semiconductor system 1 includes a host apparatus 2, electronic devices 4-1 to 4-3, and a hub 12. The hub 12 includes, for example, four ports P1 to P4 and transfers a packet in the order of the ports P1 to P4. The host apparatus 2 is connected to the port P1 of the hub 12 and the electronic devices 4-1 to 4-3 are connected to the ports P2 to P4 respectively. The configuration and operation of the host apparatus 2 and the electronic devices 4 are the same as those described in the first embodiment. Like FIG. 5 in the first embodiment, square marks in FIG. 6 show a field 11-3 (start device ID) of the payload and a field 11-4 (number of devices).

The flow of a packet during initialization operation in the configuration of FIG. 6 will be described with reference to FIG. 6. The host apparatus 2 broadcasts a packet in which the initialization command is set to a field 11-2 and the respective initial value (0) is set to the fields 11-3, 11-4. The hub 12 transfers the packet received from the host apparatus 2 to the electronic device 4-1.

The electronic device 4-1 returns the packet in which the device ID thereof is set to "5" and the values of the fields 11-3, 11-4 are updated to "5" and "1" respectively to the hub 12.

Next, the hub 12 transfers the packet received from the electronic device 4-1 to the electronic device 4-2. The electronic device 4-2 increments the device ID thereof from "5" to "6". Then, the electronic device 4-2 returns the packet in which the value of the field 11-4 is updated to "2" to the hub 12.

Next, the hub 12 transfers the packet received from the electronic device 4-2 to the electronic device 4-3. The electronic device 4-3 increments the device ID thereof from "5" by 2 to "7". Then, the electronic device 4-3 returns the packet in which the value of the field 11-4 is updated to "3" to the hub 12.

Lastly, the hub 12 returns the packet received from the electronic device 4-3 to the host apparatus 2. At this point, the values of the fields 11-3, 11-4 are "5" and "3" respectively.

Second Connection Example

Figure 7:
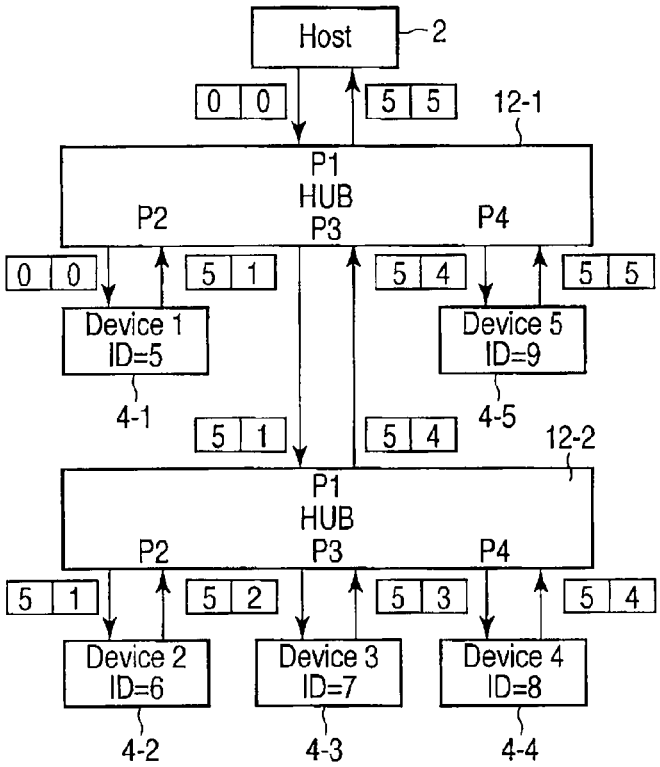
FIGS. 7 to 9 are block diagrams of a semiconductor system according to the second embodiment.

Next, a second connection example will be described by using FIG. 7. FIG. 7 is a block diagram of the semiconductor system 1 according to the second connection example. The present example relates to a two-stage hub connection.

As shown in FIG. 7, the semiconductor system 1 includes the host apparatus 2, electronic devices 4-1 to 4-5, and hubs 12-1, 12-2. For example, each of the hubs 12-1, 12-2 includes four ports P1 to P4 and transfers a packet in the order of the ports P1 to P4. The host apparatus 2 is connected to the port P1 of the hub 12, the electronic devices 4-1, 4-5 are connected to the ports P2, P4 respectively, and the port P1 of the hub 12-2 is connected to the port P3. Also, the electronic devices 4-2 to 4-4 are connected to the ports P2 to P4 of the hub 12-2 respectively. The configuration and operation of the host apparatus 2 and the electronic devices 4 are the same as those described in the first embodiment. Like FIG. 5 in the first embodiment, square marks in FIG. 6 show the field 11-3 (initial value of the device ID) of the payload and the field 11-4 (number of devices).

The flow of a packet during initialization operation in the configuration of FIG. 7 will be described with reference to FIG. 7. The host apparatus 2 broadcasts a packet in which the initialization command is set to the field 11-2 and the respective initial value (0) is set to the fields 11-3, 11-4. The hub 12-1 transfers the packet received from the host apparatus 2 to the electronic device 4-1.

The electronic device 4-1 returns the packet in which the device ID thereof is set to "5" and the values of the fields 11-3, 11-4 are updated to "5" and "1" respectively to the hub 12.

Next, the hub 12-1 transfers the packet received from the electronic device 4-1 to the hub 12-2. Subsequently, the hub 12-2 transfers the packet received from the hub 12-1 to the electronic device 4-2. The electronic device 4-2 increments the device ID thereof from "5" to "6". Then, the electronic device 4-2 returns the packet in which the value of the field 11-4 is updated to "2" to the hub 12-2.

Next, the hub 12-2 transfers the packet received from the electronic device 4-2 to the electronic device 4-3. The electronic device 4-3 increments the device ID thereof from "5" by "2" to "7". Then, the electronic device 4-3 returns the packet in which the value of the field 11-4 is updated to "3" to the hub 12-2.

Subsequently, the hub 12-2 transfers the packet received from the electronic device 4-3 to the electronic device 4-4. The electronic device 4-4 increments the device ID thereof from "5" by "3" to "8". Then, the electronic device 4-4 returns the packet in which the value of the field 11-4 is updated to "4" to the hub 12-2.

The hub 12-2 returns the packet received from the electronic device 4-4 to the hub 12-1. Then, the hub 12-1 transfers the packet received from the hub 12-2 to the electronic device 4-5. The electronic device 4-5 increments the device ID thereof from "5" by "4" to "9". Then, the electronic device 4-5 returns the packet in which the value of the field 11-4 is updated to "5" to the hub 12-1.

Lastly, the hub 12-1 returns the packet received from the electronic device 4-5 to the host apparatus 2. At this point, the values of the fields 11-3, 11-4 are "5" and "5" respectively.

Third Connection Example

Figure 8:
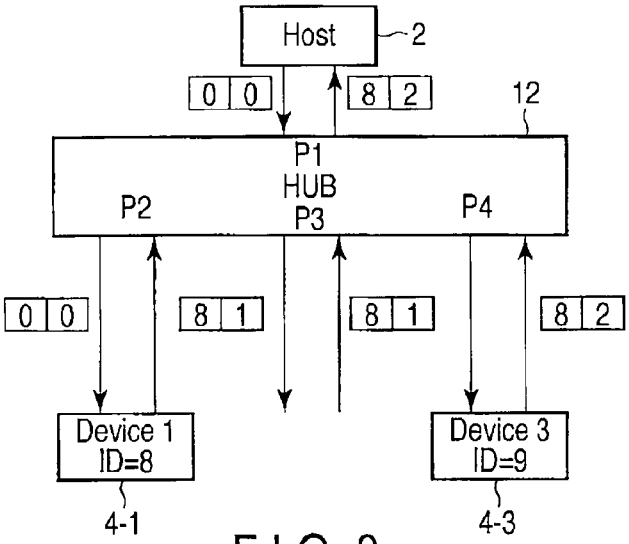

Next, a third connection example will be described. FIG. 8 is a block diagram of the semiconductor system 1 according to the third connection example. The present example is a case when the electronic device 4-2 is not present in the configuration of FIG. 6 described as the first connection example.

If, as shown in FIG. 8, the electronic device 4-1 sets "8" as the device ID thereof, the values of the fields 11-3, 11-4 of the packet received from the electronic device 4-1 by the hub 12 are "8" and "1" respectively.

The hub 12 transmits the packet received from the electronic device 4-1 to the port P3, but no electronic device is connected to the port P3. Thus, the transmitted packet is directly returned to the port P3. Therefore, next the hub 12 transfers the returned packet to the electronic device 4-3.

The subsequent operation is the same as in the first connection example.

The electronic devices 4-1, 4-2, and 4-3 are not removable, and thus, the ring connection is suitable for an embedded system. To support a removable device in the configuration thereof, the electronic device 4-4 can be configured as a removable card by including the hub 12. If the electronic device 4-4 is not connected, the hub 12 outputs a packet from the input port directly to the output port.

Fourth Connection Example

Figure 9:
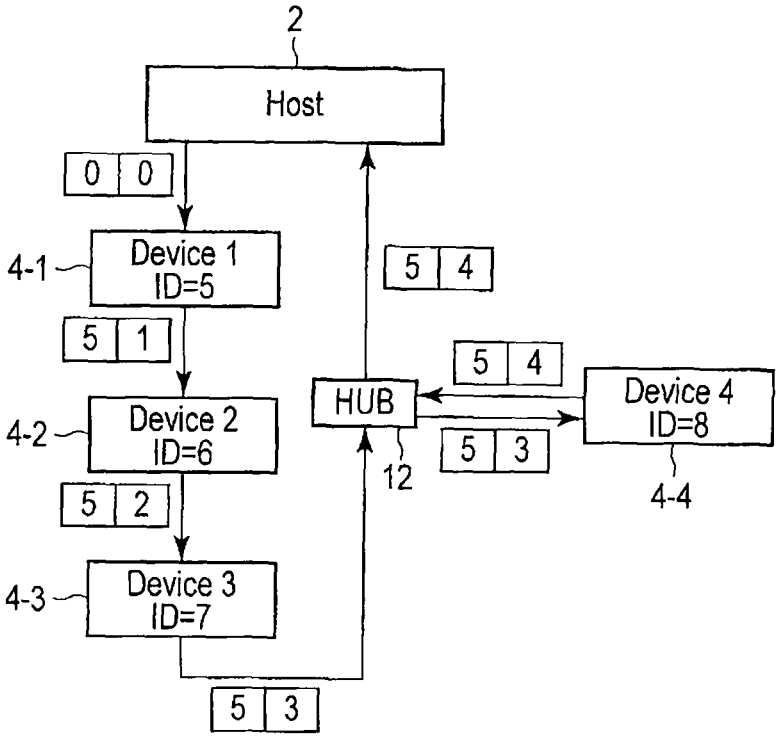

Next, a fourth connection example will be described. FIG. 9 is a block diagram of the semiconductor system 1 according to the fourth connection example. The present example is a case when the hub 12 is further combined with the connection example of FIG. 1 described in the first embodiment.

As shown in FIG. 9, the hub is connected between the electronic device 4-3 and the host apparatus 2 and the electronic device 4-4 is connected to one of ports.

The values of the fields 11-3, 11-4 of the packet received from the electronic device 4-3 by the hub 12 are "5" and "3" respectively. Then, the hub 12 transfers the packet to the electronic device 4-4. Then, the hub 12 receives the packet in which the value of the field 11-4 is updated to "4" from the electronic device 4-4 and returns the packet to the host apparatus 2.

<Effect According to the Present Embodiment>

The configuration described in the first embodiment is applicable, as described above, not only to the ring connection, but also to the hub connection and the affect described in the first embodiment is gained. Incidentally, the function to transfer a packet broadcast from the host apparatus 2 to the electronic device 4 is an inherent function of the hub 12. Therefore, the host apparatus 2 does not have to recognize the topology of the electronic devices 4.

Third Embodiment

Next, a semiconductor device and a host apparatus according to the third embodiment will be described. The present embodiment relates to a specific example of the first and second embodiments. The description of the same points as in the first embodiment is omitted below.

Figure 10:
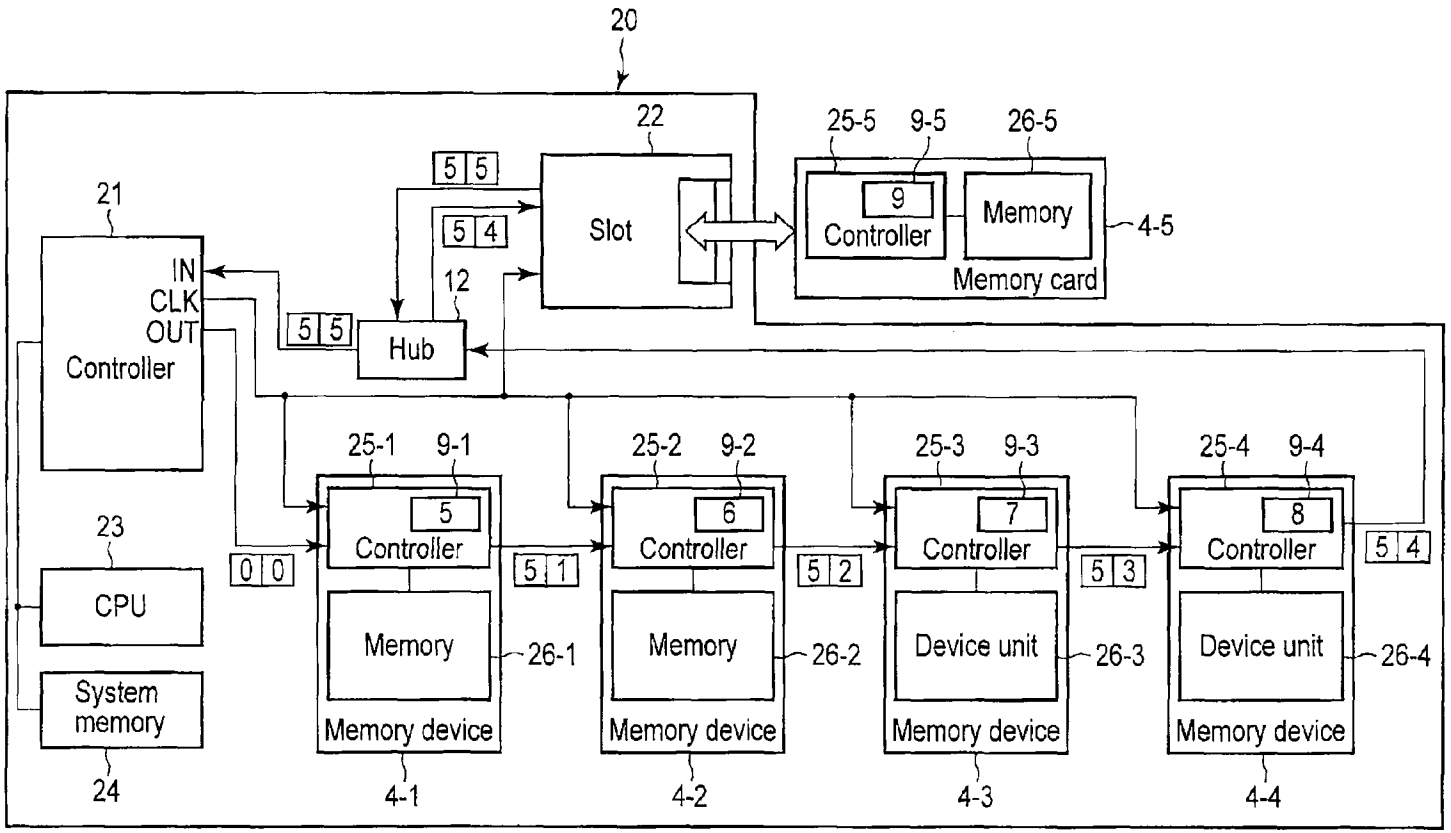
FIG. 10 is a block diagram of a semiconductor system according to a third embodiment.

FIG. 10 is a block diagram showing an example of a memory system according to the present embodiment. As shown in FIG. 10, a memory system 20 includes a host controller 21, a card slot 22, a CPU (central processing unit) 23, a system memory 24, electronic devices 4-1 to 4-4, and a hub 12.

The CPU 23 manages an overall operation of the memory system 20, and operates according to a program stored in a ROM (read only memory) or the like. The system memory 24 is used by the CPU 23 to temporarily store various kinds of data and is also used to execute an executable program.

The host controller 21 corresponds to a host apparatus 2 described in the first and second embodiments. The host controller 21 includes various kinds of hardware, software, and arrangements needed to communicate with any device (element) that can be connected to the host controller 21. More specifically, the host controller 21 is configured to be able to communicate with the electronic devices 4 via a plurality of signal lines. Signal lines include, for example, a signal line that transfers packets, a signal line that transfers clocks, and a power source line. Part of the function of the host controller 21 outputs to or captures the signals on such signal lines according to preset rules. More specifically, the host controller 21 analyzes the signal supplied through the signal line to recognize a previously-set bit pattern from the signal, and the host controller 21 captures a command from the signal. Similarly the host controller 21 recognizes a predetermined bit pattern to capture data from the signal. Various commands are prepared from the host controller 21. For example, the host controller 21 can be implemented by part of the function of the CPU, which is executed under the control of the software, or a semiconductor chip such the functions can be realized.

To be more specific, the host controller 21 supports a signal line that transfers packets and a signal line that transfers clocks. That is, the host controller 21 is configured to be able to transfer data by using these signal lines. To be more specific further, the host controller 21 is configured to be able to control, for example, the SD interface.

The electronic devices 4-1 to 4-4 are devices embedded in the memory system 20. As the electronic devices 4-1 to 4-4, any type of devices configured to be able to communicate with the CPU 23 via the host controller 21 can be used and relevant devices include, for example, memory devices and wireless LAN (local area network) devices. A main portion of devices that can be used as the electronic devices 4-1 to 4-4 can be realized by publicly known technologies in accordance with the function of each of the electronic devices 4-1 to 4-4. The electronic devices 4-1 to 4-4 can be realized by using a semiconductor chip sealed in a portable device such as an SD card.

The electronic devices 4-1 to 4-4 include device units 26-1 to 26-4 to execute respective main functions (such as the memory function, wireless LAN function and so on). Further, the electronic devices 4-1 to 4-4 include respective controllers (device controllers) 25-1 to 25-4. Each of the controllers 25-1 to 25-4 is configured to be able to communicate with the CPU 23 via the host controller 21 by using an interface. That is, the electronic devices 4-1 to 4-4 include hardware and software configurations to support such an interface.

If the host controller 21 supports the SD interface, the controllers 25-1 to 25-4 are also configured to support the SD interface. The controllers 25-1 to 25-4 may be realized as a CPU and/or a semiconductor chip independent of the device units 26-1 to 26-4. Alternatively, the controllers 25-1 to 25-4 and the device units 26-1 to 26-4 may be realized as an integrated semiconductor chip.

Each of the controllers 25-1 to 25-4 include an input signal pin 5, an output signal pin 6, a packet decoder 7, an operation module 8, a register 9, and a packet modifier 10. When the input signal pin 5, the output signal pin 6, the packet decoder 7, the operation module 8, the register 9, and the packet modifier 10 included in each of the controllers 25-1 to 25-4 should be distinguished below, these elements are denoted as input signal pins 5-1 to 5-4, output signal pins 6-1 to 6-4, packet decoders 7-1 to 7-4, operation modules 8-1 to 8-4, registers 9-1 to 9-4, and packet modifiers 10-1 to 10-4. In FIG. 10, only the registers 9-1 to 9-4 of these structural elements are shown.

The electronic devices 4-1 and 4-2 are memory devices. The electronic devices 4-1 and 4-2 contain a NAND flash memory as the device unit 26-1. The NAND flash memory includes a plurality of pages as a storage region. Each page contains a plurality of serially connected memory cell transistors. Each memory cell transistor includes a so-called stacked gate structure MOS transistor. The stacked gate structure MOS transistor contains a gate electrode in which a tunnel insulating film, a charge accumulation layer (for example, a floating gate electrode), an inter-electrode insulating film, and a control gate electrode are sequentially stacked and a source/drain diffusion layer. The threshold voltage of each memory cell transistor changes depending on the number of electrons accumulated in the charge accumulation layer and information in accordance with the difference of the threshold voltage is stored in the memory cell transistor. A control circuit containing a sense amplifier and a potential generator of the memory is configured to be able to write multi-bit data into the memory cell transistor and read multi-bit data therefrom. Data is written and read in units of pages. Data is erased in units of blocks including a plurality of pages.

The electronic devices 4-3 and 4-4 are, for example, SD TO devices and include, for example, a wireless LAN function as the device units 26-3, 26-4.

The card slot 22 is configured so that removable card-type electronic devices 4-5 (hereinafter, referred to as a card device 4-5) including memory systems and other devices supported by the card slot 22 can be inserted and removed.

The card slot 22 has terminals connected to these card devices 4-5 and lines in the interface and corresponding terminals are connected. If the host controller 21 supports the SD interface, terminals necessary for the SD interface are provided in the card slot 22.

The card device 4-5 includes all card devices capable of communicating with the host controller 21 via the SD interface such as SD memory cards and SD IO cards. In the example of FIG. 10, the card device 4-5 is an SD card. Like the electronic devices 4-1 to 4-4, the card device 4-5 includes a controller 25-5 and device unit 26-5.

The controller 25-5 includes the input signal pin 5, the output signal pin 6, the packet decoder 7, the operation module 8, the register 9, and the packet modifier 10 described in the first embodiment. If the input signal pin 5, the output signal pin 6, the packet decoder 7, the operation module 8, the register 9, and the packet modifier 10 included in the controller 25-5 should be distinguished from those of the controllers 25-1 to 25-4 of the electronic devices 4-1 to 4-4, these elements are denoted as an input signal pin 5-5, an output signal pin 6-5, a packet decoder 7-5, an operation module 8-5, a register 9-5, and a packet modifier 10-5. In FIG. 10, only the register 9-5 of these elements is shown.

The device unit 26-5 contains a NAND flash memory. The configuration of the device unit 26-5 is the same as the configuration of the device units 26-1, 26-2.

The spatial relationship among the host controller 21, the electronic devices 4-1 to 4-4, the hub 12, and the slot 22 is approximately the same as in FIG. 9 described in the second embodiment. That is, a packet transmitted from the host apparatus 2 is first received by the electronic device 4-1, then transferred from the electronic device 4-1 to the electronic device 4-2, further transferred from the electronic device 4-2 to the electronic device 4-3, further transferred from the electronic device 4-3 to the electronic device 4-4, and output from an output signal pin 6-4 of the electronic device 4-4 before being provided to the hub 12.

The hub 12 transfers the packet transferred from the electronic device 4-4 to the card slot 22 if necessary, thereby the packet being provided to the card device 4-5 inserted into the card slot 22. Then, the packet output from an output signal pin 6-5 of the card device 4-5 and/or the packet output from an output signal pin 6-4 of the electronic device 4-4 is returned to the host controller 21 via the hub 12.

When the device IDs of the electronic devices 4-1 to 4-5 are identified, a packet is sequentially transferred from the host controller 21 in the order of the electronic devices 4-1, 4-2, 4-3, 4-4, the hub 12, the card device 4-5, the hub 12, and the host controller 21. In FIG. 10, square marks attached to the side of an arrow between devices show content of the payload of a packet when the device ID is identified and the left side indicates content of a field 11-3 (start device ID) and the right side indicates content of a field 11-4 (number of devices). Numbers in the registers 9-1 to 9-5 are device IDs of the electronic devices.

That is, if the electronic device 4-1 sets the device ID thereof to "5", the fields 11-3, 11-4 of the packet output from the electronic device 4-1 have the values "5" and "1" respectively. Thus, the device ID of the electronic device 4-2 becomes "6" and the fields 11-3, 11-4 of the packet output from the electronic device 4-2 have the values "5" and "2" respectively. Then, the device ID of the electronic device 4-3 becomes "7" and the fields 11-3, 11-4 of the packet output from the electronic device 4-3 have the values "5" and "3" respectively. Then, the device ID of the electronic device 4-4 becomes "8" and the fields 11-3, 11-4 of the packet output from the electronic device 4-4 have the values "5" and "4" respectively. The packet output from the electronic device 4-4 is provided to the card device 4-5 via the hub 12 and the card slot 22. Then, the device ID of the card device 4-5 becomes "9" and the fields 11-3, 11-4 of the packet output from the card device 4-5 have the values "5" and "5" respectively. The packet is returned to the host controller 21 via the card slot 22 and the hub 12.

The above operation is performed in synchronization with the clock provided to each of the electronic devices 4-1 to 4-5 from the host controller 21.

Modifications of the Above Embodiments

A semiconductor device 3 according to the first to third embodiments includes, as described above, a first device 4-1 and a second device 4-2 are included, each of which including a decoder 7 that analyzes a command of a received packet to decide processing specified by the packet, a generation circuit 8 that generates a specific device No. in accordance with information in the packet, a register 9 holding the generated specific device No., and a modifier 10 that modifies and outputs information in the packet. The second device 4-2 receives a packet whose information has been modified by the first device 4-1 and a generation circuit 8-2 of the second device 4-2 generates the device No. that is different from the device No. of the first device 4-1.

A host apparatus 2 (and a host controller 21) according to the first to third embodiments is the host apparatus 2 connected to a plurality of devices 4, the host apparatus 2 issues a first packet in which the initial value of the device No. (start device ID: field 11-3) and the number of devices (field 11-4) are set to 0 to the first device 4-1 and receives a second packet in which the initial value (field 11-3) and the number of device (field 11-4) are corrected from the second device (the electronic device 4-3 in the example of FIG. 1) without receiving a response to the first packet from the first device 4-1 to recognize the number of the connected devices 4 and the device Nos. allocated to the devices 4 from the corrected initial value (field 11-3) and number of devices (field 11-4) in the second packet.

That is, when the device ID of the device 4 is determined, the packet issued by the host apparatus 2 is sequentially transferred between the plurality of devices 4. In this case, the device 4 that has received the packet determines the device ID thereof based on information in the packet and also updates the information in the packet to information related to the device ID thereof to transfer the packet to the next device 4 without returning a response to the packet to the host apparatus 2. Then, the last device 4 returns the packet to the host apparatus 2.

In other words, the packet issued by the host apparatus 2 sequentially passes through the devices 4 before returning to the host apparatus 2 in the end. However, the payload in the returned packet has different values of content from values of the packet issued first to device the device IDs.

With the above configuration, the host apparatus 2 can allocate a specific ID to each of the devices 4 by a simpler configuration. The above configuration can achieve an impressive effect by applying to a memory device for high-speed serial transmission.

The first to third embodiments described above can be modified in various ways. As the operation method used in step S25 of FIG. 4, for example, a case of incrementing by 1 is described as an example in the above embodiments. However, the operation method is not limited to the above example and the increment may be by 2. Alternatively the operation module 8 may hold other functions and calculate the device ID using the functions. That is, any operation rule common to both the host apparatus 2 and the electronic devices 4 may be allowed.

In step S23 of FIG. 4, a case when the any number of the device ID is other than "0" is described. If, for example, the device ID has 4 bits and the calculation method of the device ID is based on increments, the value of the device ID can be represented in the range of "0" to "15". Of these numbers, "0" is allocated as the ID of the host apparatus 2 and thus, up to 15 electronic devices 4 can be connected. If the device ID of some device 4 is "15", incrementing "15" yields "0", which is the ID of the host apparatus 2, and thus, the next device ID of the electronic device 4 is "1" after a further increment, instead of "0".

Depending on the implementation, the ID of the host apparatus 2 is not limited to "0" and may be a different value. Any device ID other than the ID of the host apparatus 2 may be allocated to the electronic device 4.

In step S23 of FIG. 4 in the above embodiments, a case when the first electronic device 4-1 selects any device ID thereof is described. However, the host apparatus 2 may specify the device ID of first device 4-1. That is, the host apparatus 2 assembles a packet 11 by storing the device ID of the electronic device 4-1 in the payload and broadcasts the packet 11. Then, the electronic device 4-1 that has received the packet 11 reads the device ID in the payload and set the device ID as the device ID of the electronic device 4-1. Such a method may also be adopted.

However, the RCA used in a conventional SD memory card is generated randomly. Thus, in view of compatibility with the conventional SD interface, the device ID in step S23 is preferably generated randomly. The setting method of device ID described in the above embodiments does not exclude the RCA and the RCA may be used at the same time.

The operation in FIGS. 3 and 4 described in the above embodiments can be performed when the semiconductor system 1 or the memory system 20 is powered-on. In addition, the operation in FIGS. 3 and 4 can be performed when one of the devices 4 is removed from the host apparatus 2 or conversely added because it is necessary to set the device ID again.

Further, the electronic device 4 may be a device having the SD interface such as an SD memory card, UHS (ultra high speed)-II card, and SD ID device or a different device. If the electronic device 4 is a memory device, the memory structure thereof is not limited to the NAND flash memory and may be NOR flash memory or a semiconductor memory other than the flash memory.

Figure 11:
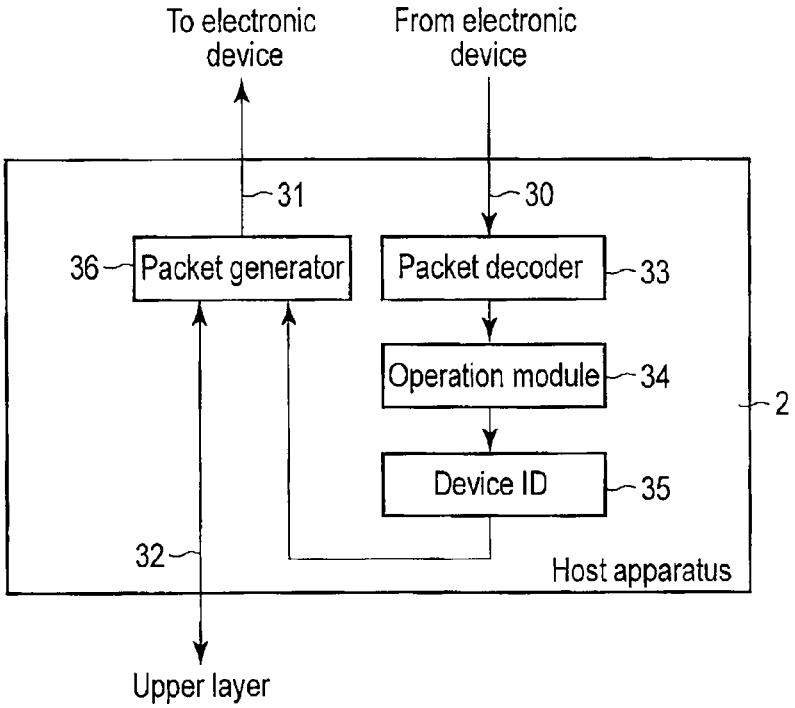
FIG. 11 is a block diagram of a host apparatus according to the first to third embodiments.

The operation of the host apparatus 2 can be performed by hardware or software. FIG. 11 is a block diagram showing an example of the hardware configuration of the host apparatus 2. As shown in FIG. 11, the host apparatus 2 includes an input signal pin 30, an output signal pin 31, an input/output signal pin 32, a packet decoder 33, an operation module 34, a memory 35, and a packet generation unit 36.

The input signal pin 30 functions as at least one input port and receives a packet provided from the electronic device 4. Then, the input signal pin 30 transfers the received packet to the packet decoder 33.

The packet decoder 33 is configured to be able to analyze the packet transferred from the input signal pin 30. The packet decoder 33 identifies processing requested from the electronic device 4 based on the command number in the packet header. Then, the packet decoder 33 instructs the operation module 34 to perform a necessary operation in accordance with the requested processing.

The operation module 34 is configured to be able to perform a necessary arithmetic operation in accordance with instructions of the packet decoder 33. An example of operation content is the calculation of the device ID and the operation module 34 holds operation rules like the electronic device 4. The operation module 34 obtains device IDs of all the electronic devices 4 connected to the host apparatus 2 from payload information of the packet received from the electronic device 4. The obtained device IDs are held in the memory 35.

The input/output signal pin 32 transmits a signal to an upper layer and receives a signal from the upper layer.

The packet generation unit 36 assembles a packet containing a command and data in response to a request from the upper layer. For this purpose, the packet generation unit 36 reads the device ID of the electronic device 4 to be the destination of the packet from the memory 35. Then, the packet generation unit 36 transmits the assembled packet to the electronic device 4 from the output signal pin 31. The packet 11 to identify the device ID of each of the electronic devices 4 in power-on or the like is also generated by the packet generation unit 36. The memory 35 may have information about whether each command is a broadcast command or not.

The host apparatus 2 may have the hardware configuration described above. The packet decoder 33, the operation module 34, and the packet generation unit 36 may be a processor such as a CPU. Then, by executing a program held in the memory 35, the processor may function as the packet decoder 33, the operation module 34, or the packet generation unit 36 to execute the steps shown in FIG. 3.

This also applies to the electronic device 4 and the function of the packet decoder 7, the operation module 8, or the packet modifier 10 may be taken over by a processor such as a CPU. Also in this case, by executing a program held in the electronic device 4, the processor may function as the packet decoder 7, the operation module 8, or the packet modifier 10 to execute the steps shown in FIG. 4 (or FIG. 13 described later).

Figure 12:
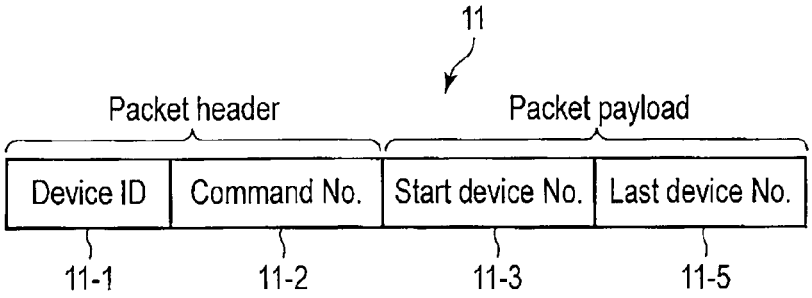
FIG. 12 is a conceptual diagram of a frame format according to a modification of the first to third embodiments.

In the above description, the packet 11 may contain, instead of the number of devices (field 11-4), the last device No. (field 11-5). FIG. 12 is a schematic diagram showing the structure of the packet 11 in this case. The last device No. is the value of the device ID of the last electronic device 4 through which the packet passes.

Figure 13:
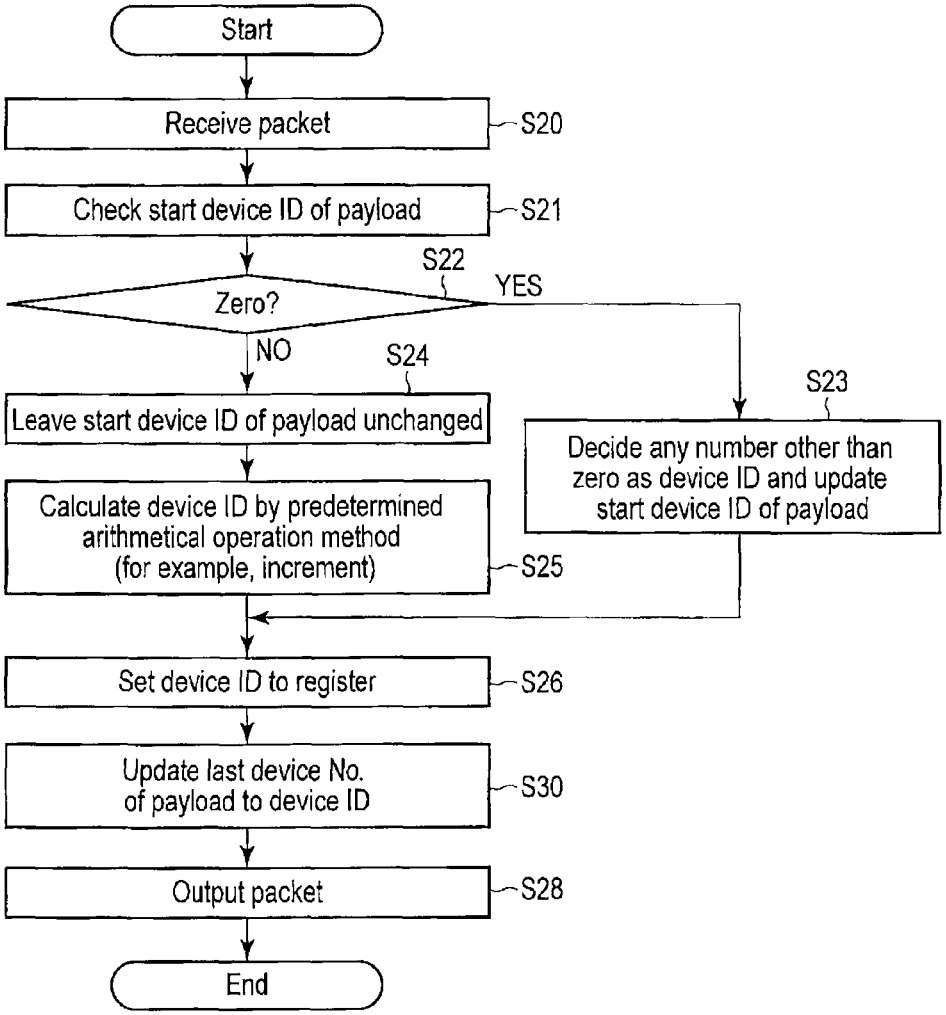
FIG. 13 is a flow chart showing an operation of a device according to the modification of the first to third embodiments.

Even when the packet in FIG. 12 is used, the operation of the host apparatus 2 and the electronic device 4 is approximately the same as in the first embodiment. FIG. 13 is a flow chart showing the operation of the electronic device 4. The operation of the electronic device 4 is different from FIG. 4 described in the first embodiment in that, after step S26, the electronic device 4 sets the device ID thereof to the last device No. (field 11-5) (step S30). Otherwise, the operation is the same as in the first embodiment.

The operation of the host apparatus 2 is approximately the same as in FIG. 3, but in step S13, the start device No. and the last device No. are read. Then, based on at least one of these Nos., the total number of the electronic devices 4 and the device ID of each of the electronic devices 4 are calculated.

Figure 14:
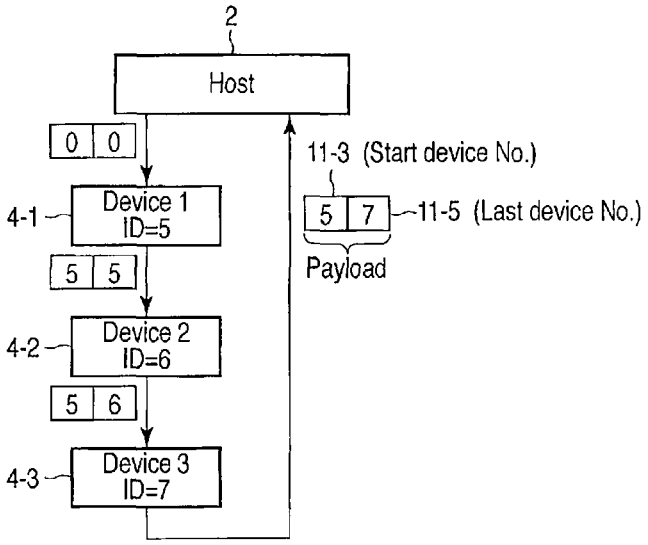
FIG. 14 is a block diagram of a semiconductor system according to the modification of the first to third embodiments.

FIG. 14 is a block diagram of the semiconductor system 1 when the packet in FIG. 12 is used. Like in FIG. 5, square marks attached to the side of an arrow between devices in FIG. 14 show content of the payload of the packet and the left side is the field 11-3 (start device ID) and the right side is the field 11-5 (last device No.).

As shown in FIG. 4, the values of the fields 11-3, 11-5 of a packet first issued by the host apparatus 2 are predetermined values (0) set by the host apparatus 2. If the packet is received by the electronic device 4-1, the electronic device 4-1 determines the device ID thereof as "5". Then, the electronic device 4-1 sets the value to both the fields 11-3, 11-5.

Next, the packet output from the electronic device 4-1 is received by the electronic device 4-2. The electronic device 4-2 determines the device ID thereof as "6" according to a preset operation method based on the value of the field 11-3 (and/or the field 11-5). Then, the electronic device 4-2 outputs the packet after updating the value of the field 11-5 to "6", which is the device ID thereof, while leaving the value of the field 11-3 unchanged. Similarly, the electronic device 4-3 sets the device ID thereof to the field 11-5.

As a result of the foregoing, the value of the field 11-3 is "5" and the value of the field 11-5 is "7" in the packet received by the host apparatus 2 from the electronic device 4-3. Therefore, the host apparatus 2 grasps that the device IDs of the electronic devices 4-1, 4-3 are "5" and "7" respectively. Also, the host apparatus 2 recognizes that the total number of the electronic devices 4 is 3 (=last device ID−start device ID+1) and the device ID of each of the electronic devices 4 from the operation method (for example, an increment) of the device ID.

Figure 15:
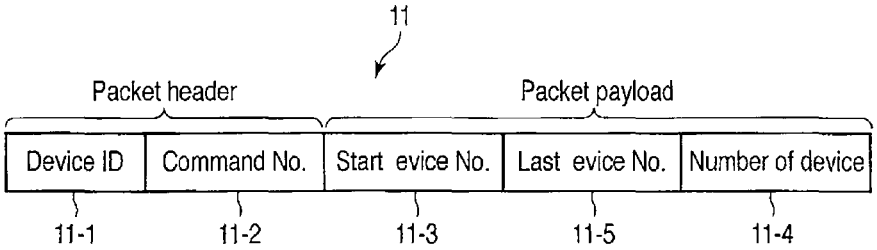
FIG. 15 is a conceptual diagram of the frame format according to the modification of the first to third embodiments.

The method described above may be used. Also in this case, the device ID allocated to each of the electronic devices 4 is any value excluding the value (for example, "0") allocated to the host apparatus 2. If the initial value (value set by the electronic device 4-1 that first receives the packet 11) of the start device ID is "1", the last device No. can be considered as the number of devices (field 11-4). As shown schematically in FIG. 15, the payload of the packet 11 may contain the start device ID (field 11-3), the number of devices (field 11-4), and the last device No. (field 11-5). In the example of FIG. 15, the payload of the packet 11 holds information in the order of the start device ID, last device ID, and number of devices. In this case, the operation of each of the electronic devices 4 is the combination of FIGS. 4 and 13 and the fields 11-4, 11-5 are updated and also the field 11-3 is updated if necessary. The host apparatus 2 recognizes the total number of the electronic devices 4 and each device ID based on at least one of the fields 11-3 to 11-5.

In the above embodiments, a case when, in step S21 of FIG. 4, the electronic device 4 checks the start device ID (field 11-3) of the payload of the packet 11 and if the start device ID is zero (step S22, YES), the electronic device 4 sets the device ID thereof to any value is taken as an example. However, various methods can be used as the method of setting any device ID, in other words, the method of determining whether the electronic device 4 is the first electronic device to receive the packet 11 from the host apparatus 2.

For example, the determination may be made depending on whether the last device ID (or the number of devices) is "0". That is, in step S21 of FIG. 4, the electronic device 4 that has received the packet 11 determines whether the value of the last device ID (field 11-5) or the number of devices (field 11-4) is zero. As described above, if the initial value (value arbitrarily set by the electronic device 4-1 that first receives the packet 11) of the start device ID is "1", the number of devices and the last device ID are synonymous. If the last device ID or the number of devices is zero (step S22, YES), the electronic device 4 sets any value as the device ID thereof. If the last device ID or the number of devices is not zero (step S22, NO), the electronic device 4 proceeds to step S24.

That is, whether the electronic device 4 is the first device, that is, the electronic device that first receives the packet 11 issued by the host apparatus 2 can be determined by checking the value of the start device ID (field 11-3) and/or the last device ID (field 11-5) in the packet 11. If, for example, the start device ID or the last device ID is "0", the electronic device 4 determines to the first device and generates the device ID thereof. If the start device ID or the last device ID is not "0", the electronic device 4 does not determine to the first device.

As the method of deciding the initial value of the start device ID in step S24, two methods can be considered: specifying the number by the host apparatus 2 and deciding the value by the electronic device 4. If the value of the field 11-3 (start device ID) of the received packet 11 is a specific value, the electronic device 4 generates an arbitrary value and sets the value as the device ID thereof (of the electronic device 4-1). On the other hand, if the value of the field 11-3 (start device ID) of the received packet 11 is not a specific value, the electronic device 4 performs a predetermined function to set the device ID thereof. If the function is an increment, the value obtained by adding "1" to the value of the field 11-3 becomes the device ID thereof. In other words, the electronic device 4 determines whether the electronic device 4 receives the packet 11 as the first device. If the electronic device 4 determines that the electronic device 4 receives the packet 11 as the first device, the electronic device 4 can decide the device ID arbitrarily or in accordance with the start device ID.

Further, in the above embodiments, operations are described by using a variety of flow charts. However, each flow chart is only an example, as many steps as possible can be replaced, a plurality of steps can be executed simultaneously, and some steps may be omitted according to circumstances.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

[1. A semiconductor device comprising a device, the device including:

a decoder which analyzes a command of a received packet to determine processing specified by the packet;

a generation circuit which generates a unique device number in accordance with information in the packet;

a register which holds the generated unique device number; and a modifier which updates and outputs the packet, wherein when a packet issued by a host is a command packet, among broadcast packets which return to the host through one or more devices, for determining the unique device number, the command packet includes parameters of an initial value and final value of device number, the device determines, based on the final value, whether the device has first received the command packet from the host for determining the unique device number, the device, when the device determines that the device has first received the command packet from the host for determining the unique device number, determines device number in accordance with the initial value of the received command packet, sets the determined device number to the register, updates the initial value and the final value in the command packet to the determined device number, and transmits the command packet to a next device or the host, wherein if the initial value is a predetermined value, the device number of the device is arbitrarily determined by the device, otherwise the device number of the device is determined by the host, when the device determines that the device has not first received the command packet from the host for determining the unique device number, calculates device number different from determined device number of another device by incrementing the final value in the received command packet, set the calculated device number to the register, updates the final value to the calculated device number without updating the initial value in the command packet, and transmits the command packet to a next device or the host, and the updated initial value and the updated final value are set to the same fields as those of the initial value and the final value before updating.]

[2. A semiconductor device comprising a device, the device including:

a decoder which analyzes a command of a received packet to determine processing specified by the packet;

a generation circuit which generates a unique device number in accordance with information in the packet;

a register which holds the generated unique device number; and a modifier that updates and outputs the packet, wherein when a packet issued by a host is a command packet, among broadcast packets which return to the host through one or more devices, for determining the unique device number, the command packet includes parameters of an initial value of device number and the number of devices, the device, when the device determines that the device has first received the command packet from the host for determining the unique device number, determines device number in accordance with the initial value of the received command packet, sets the determined device number to the register, updates the initial value and the number of devices in the command packet to the determined device number and "1", respectively, and transmits the command packet to a next device or the host, wherein if the initial value is a predetermined value, the device number of the device is arbitrarily determined by the device, otherwise the device number of the device is determined by the host, when the device determines that the device has not first received the command packet from the host for determining the unique device number, calculates device number different from determined device number of another device by incrementing the number of devices in the received command packet, set the calculated device number to the register, updates the number of devices to incremented value without updating the initial value in the command packet, and transmits the command packet to a next device or the host, and the updated initial value and the updated number of devices are set to the same fields as those of the initial value and the final value before updating.]

[3. The device according to claim 2, wherein the device number of the device which does not first receive the command packet from the host is equal to the value obtained by adding the initial value and the number of devices in the received command packet.]

[4. A host apparatus configured to connect to a plurality of devices, wherein the host apparatus issues a first packet in which an initial value and a final value of a device number are set to predetermined values to a first device, receives a final packet in which the initial value and the final value are updated through all the devices from a final device, and recognizes a number of the connected devices and the device numbers allocated to the devices from the updated initial value and final value in the final packet, wherein if the host apparatus sets a predetermined value as the initial value, the device number of the first device is arbitrarily determined by the first device, otherwise the device number of the first device is determined by the host apparatus, and the updated initial value and the updated final value are set to the same fields as those of the initial value and the final value before updating.]

[5. A host apparatus configured to connect to a plurality of devices, wherein the host apparatus issues a first packet in which an initial value of a device number and the number of the devices are set to predetermined values to a first device, receives a final packet in which the initial value and the number of the devices are updated through all the devices from a final device, recognizes the updated initial value in the final packet as a device number of the first device, and calculates the device numbers of the plurality of devices based on the updated initial value and the number of devices in the final packet, wherein if the host apparatus sets a predetermined value as the initial value, the device number of the first device is arbitrarily determined by the first device, otherwise the device number of the first device is determined by the host apparatus, and the updated initial value and the updated number of devices are set to the same fields as those of the initial value and the number of devices before updating.]

*6. An electric device comprising a device, the device including:*

*a decoder which analyzes information fields issued from a host to determine processing specified by the information fields including a command;*

*an operation circuit which generates a unique device number in accordance with the information fields;*

*a register which holds the generated unique device number; and*

*a modifier which updates the information fields and outputs the updated information fields, wherein*

*in a case when the command is a broadcast command which returns to the host through one or more devices, for determining the unique device number and the information fields further includes parameters of an initial value of device number and the number of devices,*

*when the operation circuit determines that the device has first received the information fields from the host for determining the unique device number,*

*the operation circuit determines a device number in accordance with the initial value of the device number and sets the determined device number to the register, and*

*the modifier updates the initial value of device number and the number of devices in the information fields to the determined device number and "1", respectively, and transmits the information fields to a next device or the host, wherein if the initial value is a predetermined value, the device number of the device is arbitrarily determined by the device except for the predetermined value, otherwise the device number of the device is the predetermined value, and*

*when the operation circuit determines that the device has not first received the information fields from the host for determining the unique device number,*

*the operation circuit calculates device number different from determined device number of another device by incrementing the number of devices in the information and sets the generated device number to the register, and*

*the modifier updates the number of devices to incremented value without updating the initial value in the information fields, and transmits the command packet to a next device or the host, and*

*the updated initial value and the updated number of devices are set to the same information fields as those of the initial value and the number of devices before updating.*

*7. The electric device according to claim 6, wherein the information fields are included in a packet which contains a packet header and a payload.*

*8. The electric device according to claim 7, wherein the command is assigned to the packet header and the initial value of device number and the number of devices are assigned to the payload.*

*9. The electric device according to claim 6, wherein the electronic device has an SD interface.*

*10. The electric device according to claim 9, wherein the electronic device is either one of SD memory card, UHS-II card, and SD ID card.*

* * * * *